United States Patent
Wood et al.

(10) Patent No.: US 9,631,753 B2
(45) Date of Patent: Apr. 25, 2017

(54) HYDRAULIC FITTING FOR A HYDRAULIC HOSE

(71) Applicant: Marine Canada Acquisition Inc., Richmond (CA)

(72) Inventors: Neal Wood, Coquitlam (CA); Richard Redfern, Richmond (CA)

(73) Assignee: Marine Canada Acquisition Inc., Richmond (CA)

( * ) Notice: Subject to any disclaimer, the term of this patent is extended or adjusted under 35 U.S.C. 154(b) by 278 days.

(21) Appl. No.: 14/487,086

(22) Filed: Sep. 15, 2014

(65) Prior Publication Data

US 2015/0102597 A1    Apr. 16, 2015

Related U.S. Application Data

(60) Provisional application No. 61/877,918, filed on Sep. 13, 2013.

(51) Int. Cl.
*F16L 27/00* (2006.01)
*F16L 33/207* (2006.01)
*B63H 20/12* (2006.01)
*F16L 19/00* (2006.01)

(52) U.S. Cl.
CPC .......... *F16L 33/2071* (2013.01); *B63H 20/12* (2013.01); *F16L 19/00* (2013.01)

(58) Field of Classification Search
USPC ......................... 285/256, 242, 272
See application file for complete search history.

(56) References Cited

U.S. PATENT DOCUMENTS

| | | | | |
|---|---|---|---|---|
| 3,710,005 | A | * 1/1973 | French | H01R 9/05 174/75 C |
| 4,804,212 | A | 2/1989 | Vyse | |
| 5,456,614 | A | * 10/1995 | Szegda | H01R 9/0521 285/256 |
| 2010/0327579 | A1 * | 12/2010 | Montena | F16L 33/225 285/382 |

* cited by examiner

*Primary Examiner* — Aaron Dunwoody
(74) *Attorney, Agent, or Firm* — Cameron IP

(57) ABSTRACT

A hydraulic hose fitting comprises a hydraulic hose engaging portion and a hydraulic port engaging portion. The hydraulic hose engaging portion includes a body having an axial bore extending therethrough and a stem press-fit into the axial bore. The hydraulic port engaging portion is coupled to the hydraulic hose engaging portion. The hydraulic port engaging portion may be a swivel nut.

9 Claims, 11 Drawing Sheets

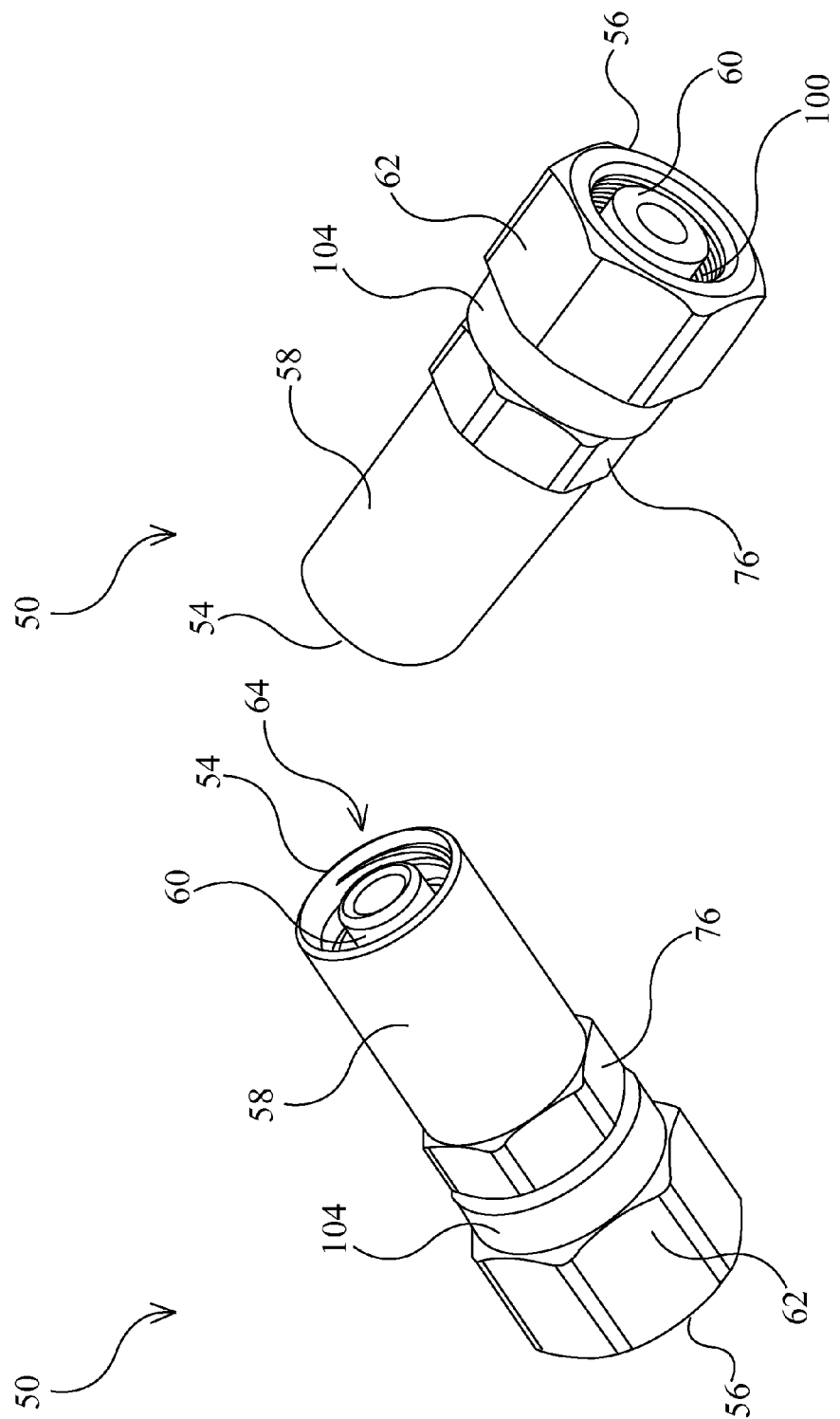

HYDRAULIC FITTING FOR A HYDRAULIC HOSE

BACKGROUND OF THE INVENTION

Field of the Invention

The present invention relates to a hydraulic fitting and, in particular, to a hydraulic fitting which may be used to couple a hydraulic hose to a hydraulic device.

Description of the Related Art

Conventional hydraulic fittings generally comprise a body having an axial bore extending therethrough, a ferrule, and a swivel nut. The body includes a stem which is received by a hydraulic hose and the ferrule is used to clamp or crimp the hydraulic hose into mechanical engagement with the hydraulic fitting. The swivel nut is used to couple the hydraulic fitting to a hydraulic port of a hydraulic device. The hydraulic hose is thereby placed in hydraulic communication with the hydraulic device. The hydraulic device may be a hydraulic actuator, a hydraulic pump, a hydraulic valve, etc. An example of a hydraulic fitting similar to the type described above is disclosed in U.S. Pat. No. 4,804,212 to Vyse.

SUMMARY OF THE INVENTION

There is provided a hydraulic hose fitting comprising a body having an axial bore extending between a first end and a second end thereof. There is a stem press-fit into the axial bore of the body and a swivel nut coupled to the body. The hydraulic hose fitting may be made from stainless steel, and the body and the stem may be made from different materials.

The body may include a protruding polygonal outer wall portion. The body may include a grooved inner wall portion and a smooth inner wall portion. The grooved inner wall portion may extend between the first end of the body and the smooth inner wall portion. The smooth inner wall portion may extend between the grooved inner wall portion and the second end of the body. The stem may include an outer wall which frictionally engages the smooth inner wall portion of the body when the stem is press-fit into the body. There may be a plurality of barbs extending about the outer wall of the stem. The swivel nut may include a through-bore and a collar which is circumambient of the through-bore. The collar may couple the swivel nut to the stem press-fit into the body.

The stem may include a step extending about the outer wall thereof between a first end and a second end thereof. The stem may include a flange extending about the outer wall thereof between the step and the second end of the stem. The stem may include an annular groove extending about the outer wall thereof between the flange and the second end of the stem. There may be an O-ring disposed in the annular groove. The body may include a shoulder adjacent the second end thereof. The shoulder may receive an O-ring which is retained in place by the flange of the stem.

There is also provided a hydraulic hose including a hydraulic hose fitting. The hydraulic hose fitting comprises a body having an axial bore and an inner wall. There is a stem press-fit into the axial bore of the body. The stem has an outer wall which forms an annulus with the inner wall of the body. There is a swivel nut coupled to the body. The hydraulic hose is received within the annulus of the hydraulic hose fitting.

BRIEF DESCRIPTIONS OF DRAWINGS

The invention will be more readily understood from the following description of the embodiments thereof given, by way of example only, with reference to the accompanying drawings, in which:

FIG. 3 is a first perspective view of the hydraulic fitting of FIG. 1;

FIG. 4 is a second perspective view of the hydraulic fitting of FIG. 1;

DESCRIPTIONS OF THE PREFERRED EMBODIMENTS

Figure 1:
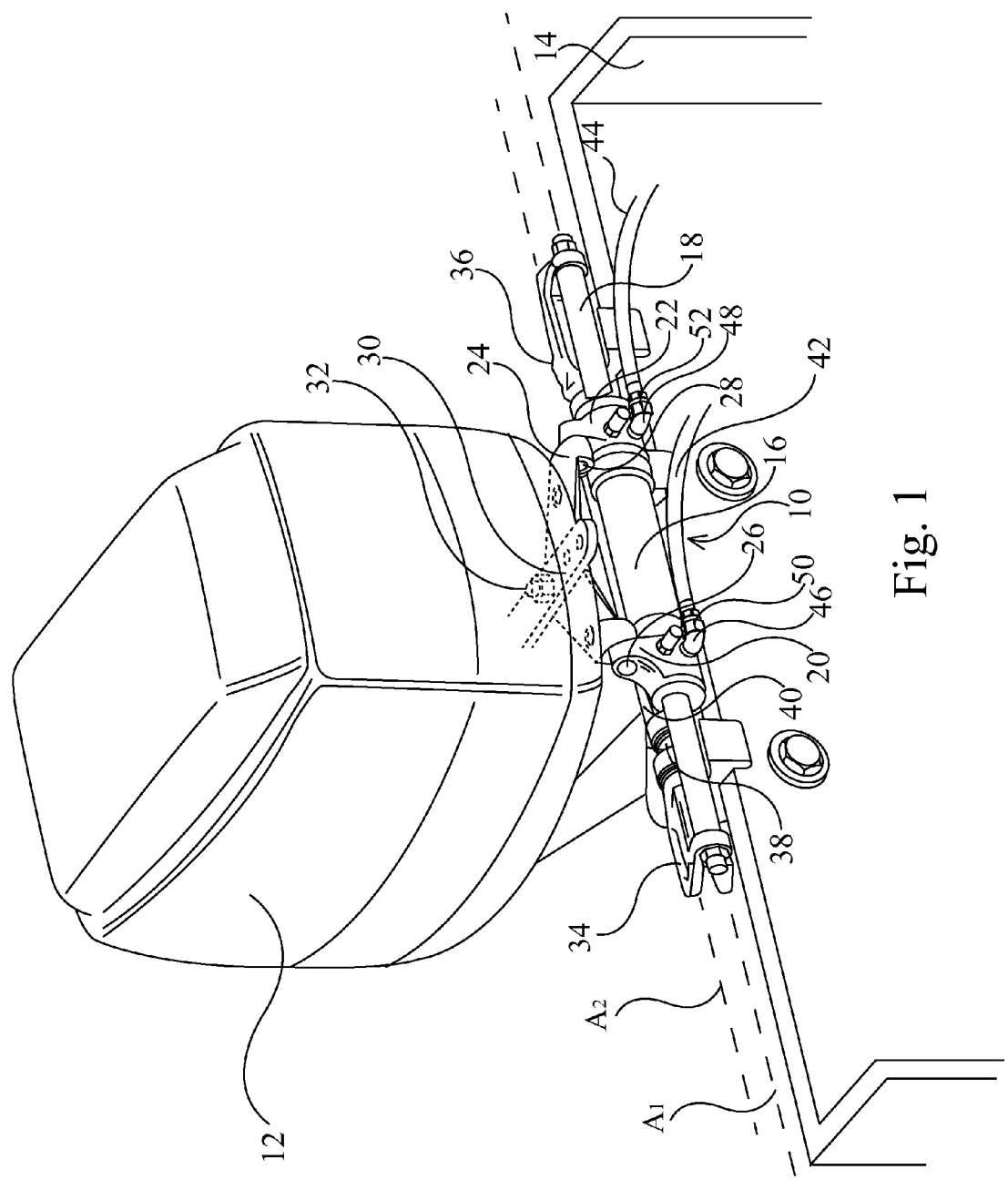
FIG. 1 is a perspective view showing a first embodiment of an improved hydraulic fitting coupling a hydraulic hose to a hydraulic actuator of a propulsion unit of a marine vessel.
Figure 2:
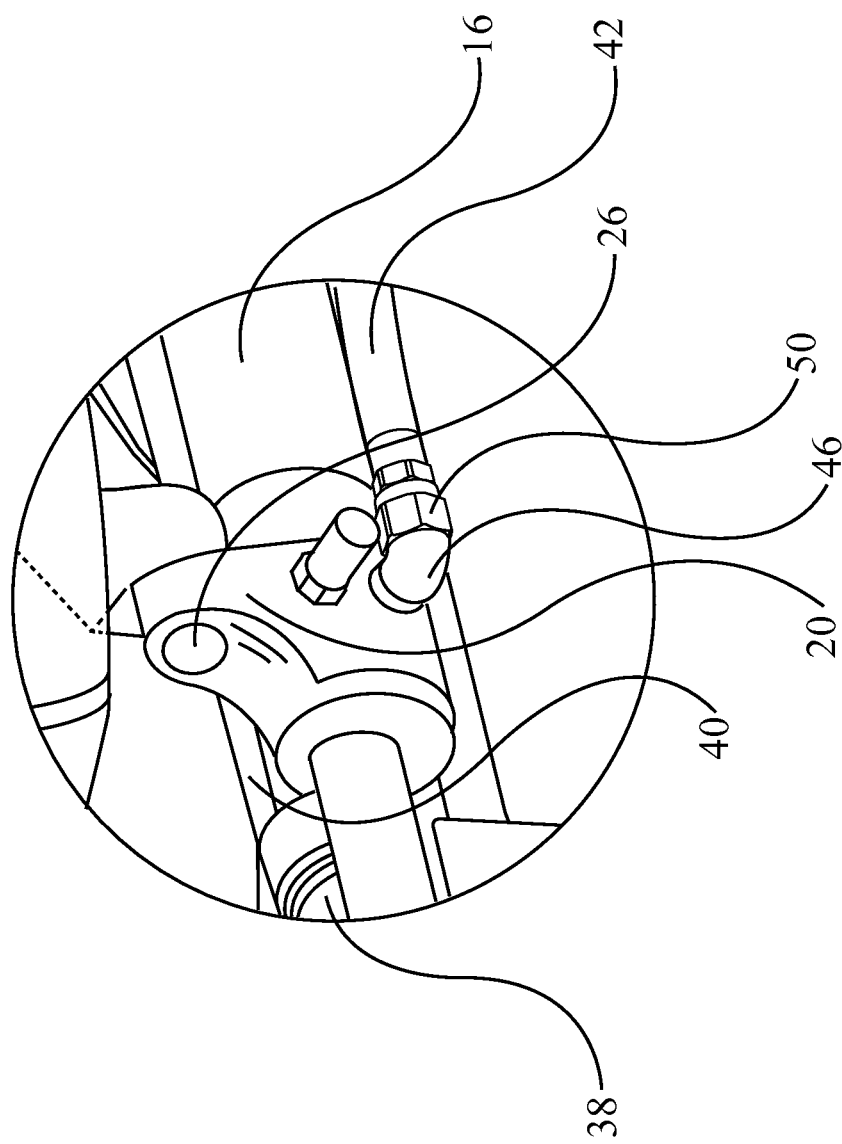
FIG. 2 is a perspective view showing the hydraulic fitting of FIG. 1 coupling the hydraulic hose to the hydraulic actuator.
Figure 5:
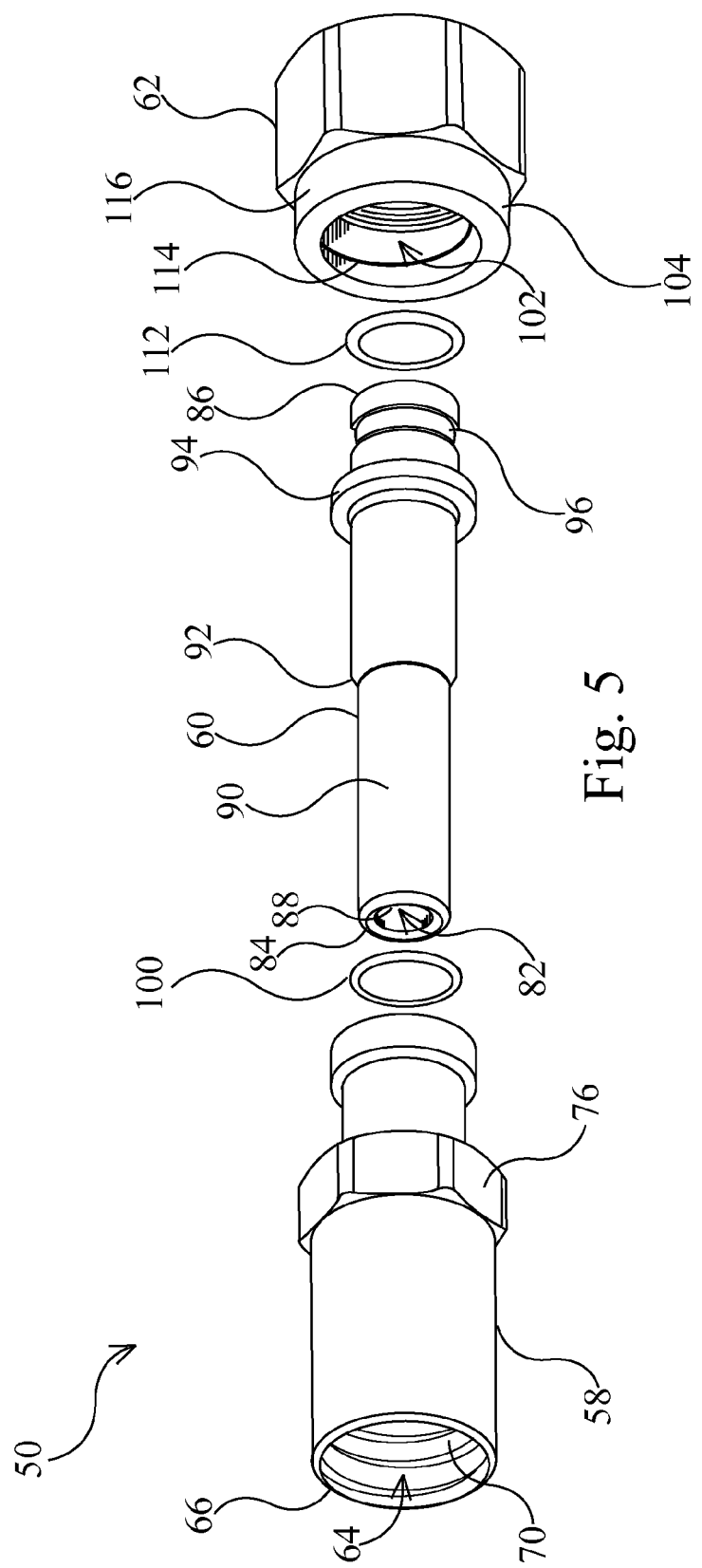
FIG. 5 is a first exploded perspective view of the hydraulic fitting of FIG. 1.
Figure 6:
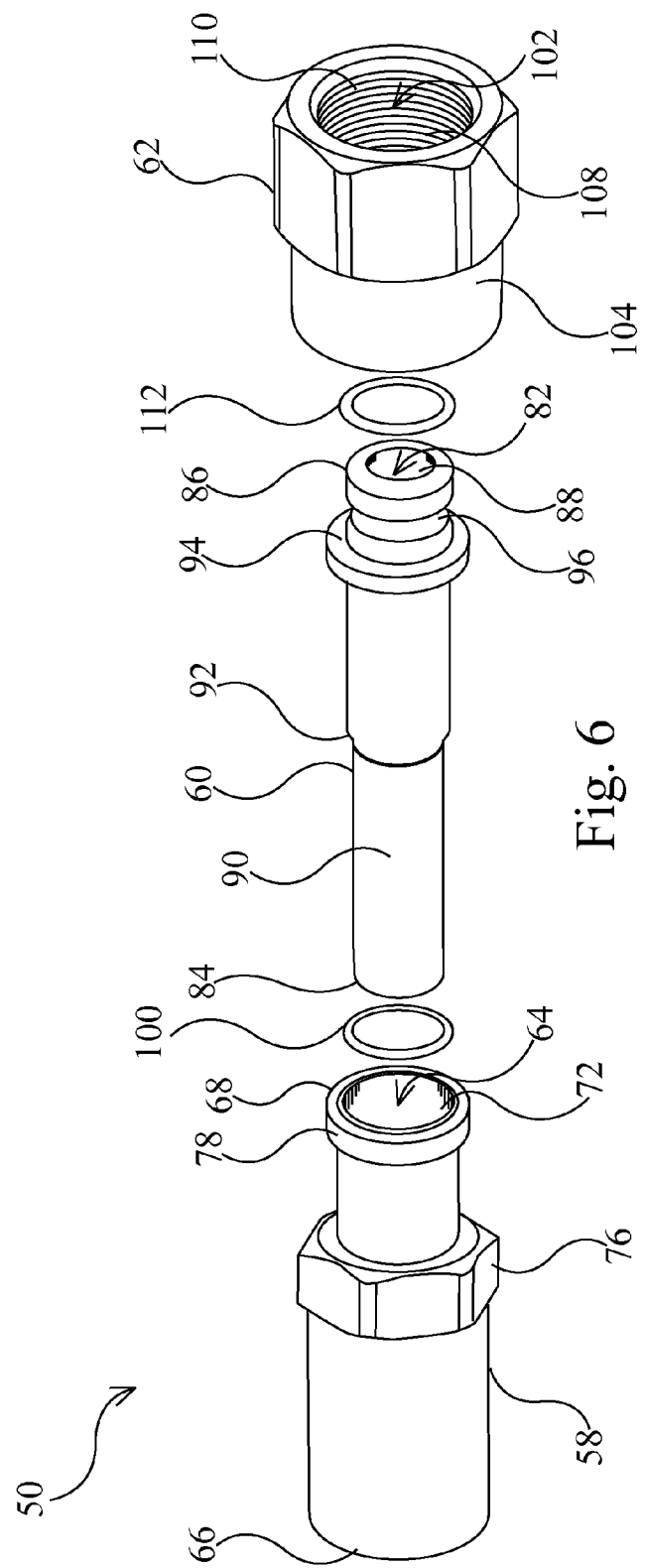
FIG. 6 is a second exploded perspective view of the hydraulic fitting of FIG. 1.

Referring to the drawings and first to FIGS. 1 and 2, there is shown a hydraulic steering assembly 10 for steering a propulsion unit 12 of a marine vessel 14. The marine vessel 14 is shown in fragment. The hydraulic steering assembly 10 includes an actuator in the form of a hydraulic cylinder 16 with a piston rod 18 reciprocatingly mounted therein allowing for relative movement of the hydraulic cylinder 16 along a piston rod axis $A_1$. The hydraulic cylinder 16 has a pair of spaced-apart cylinder arms 20 and 22 which extend radially outward of the hydraulic cylinder 16. A pivot plate 24 is pivotably connected to each of the cylinder arms 20 and 22 by means of respective pivot pins 26 and 28. The pivot plate 24 extends between the cylinder arms 20 and 22 and can pivot about the pivot pins 26 and 28. A steering member or tiller 30 of the propulsion unit 12 is pivotably connected to the pivot plate 24 by a pivot pin 32. Support arms 34 and 36 connect respective ends of the piston rod 18 to a support rod 38 of a tilt tube 40 of the propulsion unit 12. The support arms 34 and 36 restrict axial movement of the piston rod 18 relative to the marine vessel 14. The support arms 34 and 36 also allow arcuate movement of the hydraulic cylinder 16 and the piston rod 18 about a tilt axis $A_2$, while maintaining the piston rod axis $A_1$ parallel to the tilt axis $A_2$.

Hydraulic hoses 42 and 44 hydraulically connect opposite ends of the hydraulic cylinder 16 to a helm pump (not shown). Hydraulic fluid pumped from the helm pump actuates the hydraulic cylinder 16 to reciprocate linearly relative to the piston rod 18 as is known in the art. The piston rod 18 remains axially stationary relative to the marine vessel 14 while the hydraulic cylinder 16 reciprocates linearly relative to the marine vessel 14. This relative linear movement of the hydraulic cylinder 16 causes the tiller 30 of the propulsion unit 12 to pivot, thereby causing the propulsion unit 12 to be steered. In this example, the hydraulic hoses 42 and 44 are connected to respective hydraulic ports 46 and 48 of the hydraulic cylinder 16 by respective hydraulic fittings 50 and 52. The hydraulic fittings 50 and 52 are substantially similar. Accordingly, only one hydraulic fitting 50 is described in detail herein with the understanding that the other hydraulic fitting 52 has a substantially similar structure and functions in a substantially similar manner.

The hydraulic fitting 50 is shown in greater detail in FIGS. 3 to 7. An open first end of the hydraulic fitting 50 is a hydraulic hose engaging end 54 while an open second end of the hydraulic fitting 50 is a hydraulic port engaging end 56. The hydraulic fitting 50 may accordingly couple the hydraulic hose 42 to the hydraulic port 46 of the hydraulic cylinder 16 as shown in FIG. 2. Referring back to FIGS. 3 to 7, the hydraulic fitting 50 generally includes a body 58, a stem 60, and a swivel nut 62. Together the body 58 and the stem 60 form a hydraulic hose engaging portion of the hydraulic fitting 50 while the swivel nut 62 is a hydraulic port engaging portion of the hydraulic fitting 50.

Figure 7:
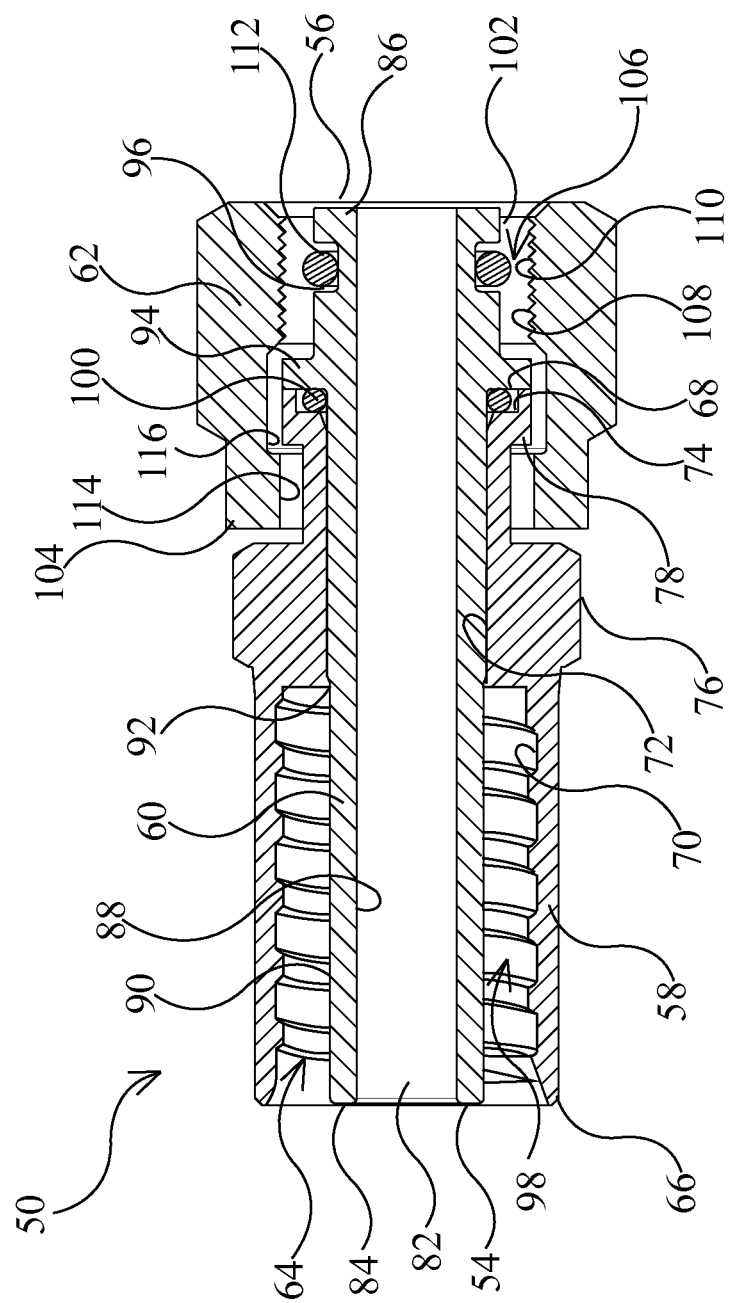
FIG. 7 is a cross-sectional view of the hydraulic fitting of FIG. 1.
Figure 9:
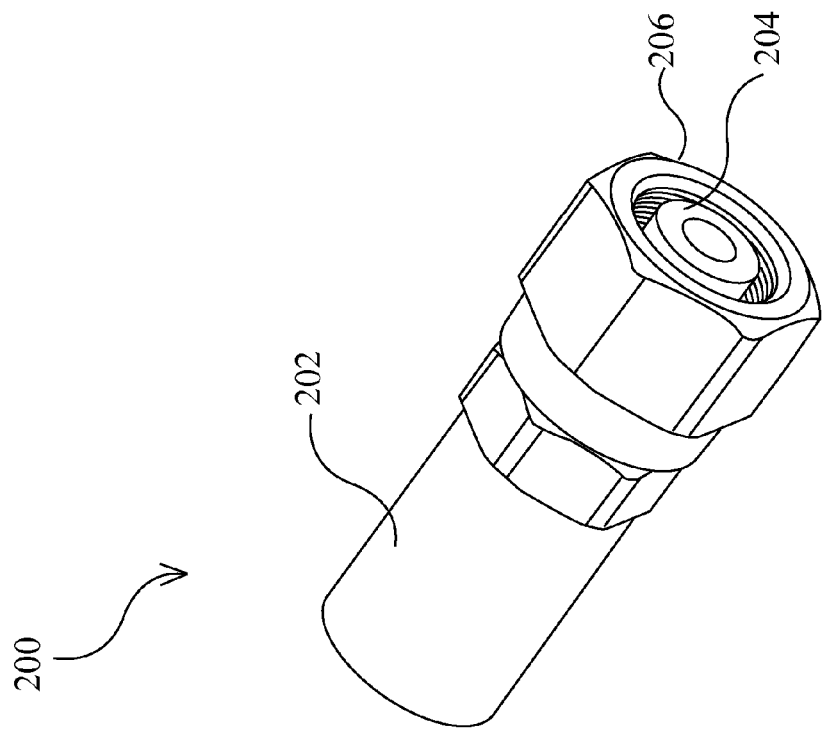
FIG. 9 is a second perspective view of the hydraulic fitting of FIG. 8.
Figure 8:
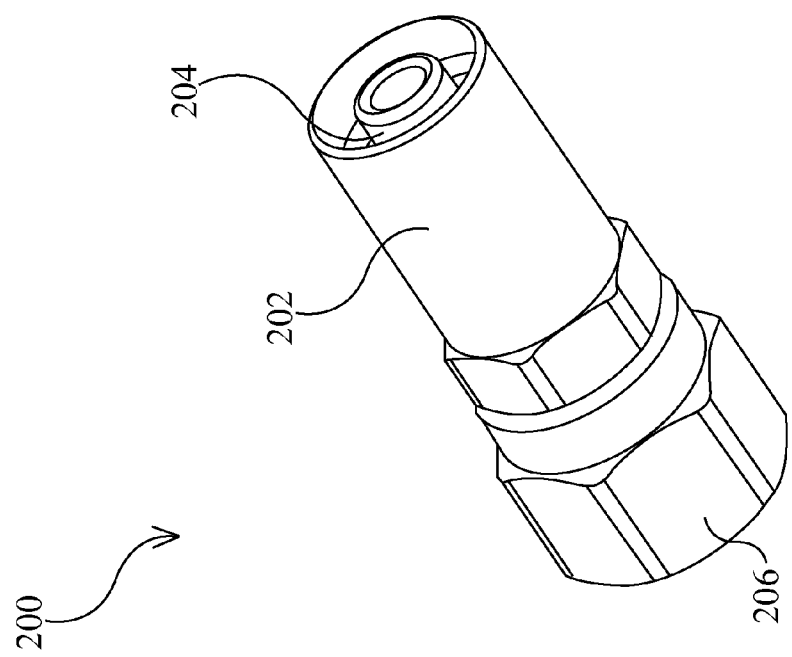
FIG. 8 is a first perspective view of a second embodiment of an improved hydraulic fitting.
Figure 10:
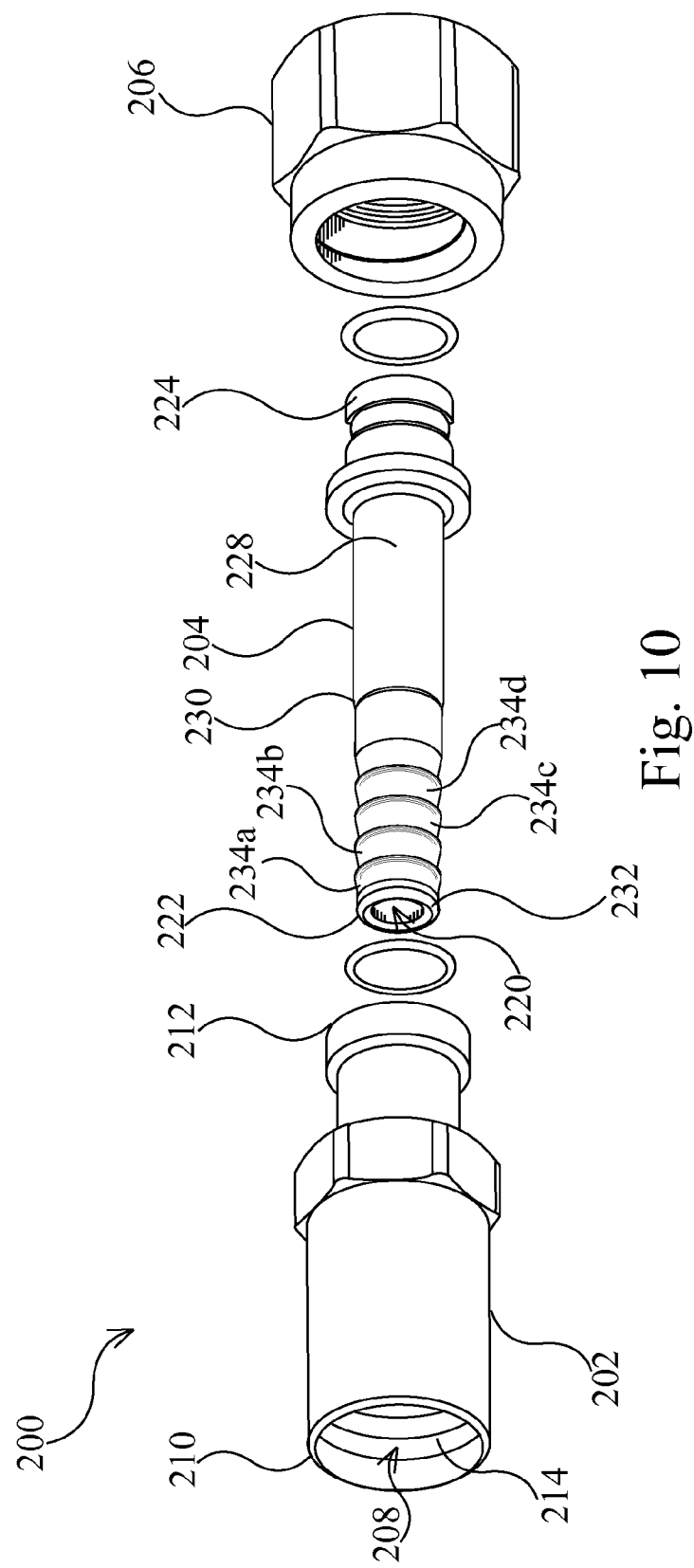
FIG. 10 is a first exploded perspective view of the hydraulic fitting of FIG. 8.
Figure 11:
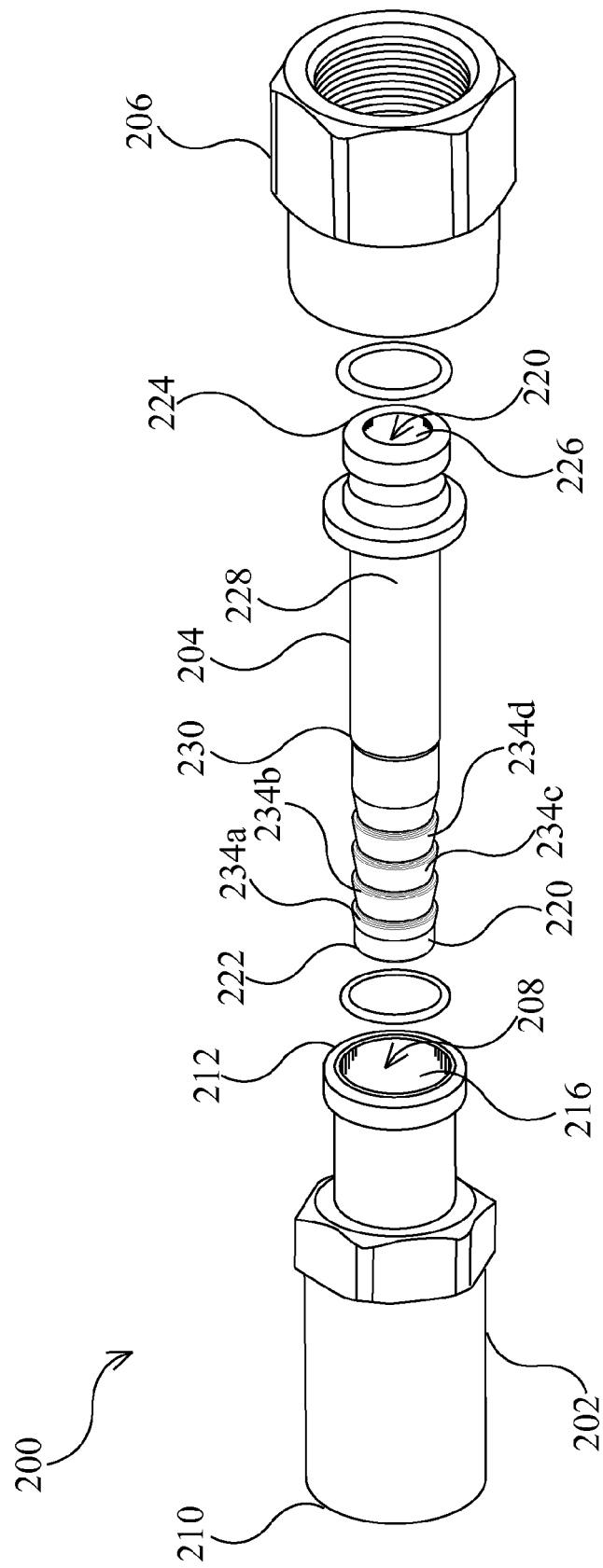
FIG. 11 is a second exploded perspective view of the hydraulic fitting of FIG. 8.

The body 58 is generally cylindrical, in this example, and has an axial bore 64 extending between a first end 66 and a second end 68 thereof. The body 58 also has a grooved inner wall portion 70 which, in this example, is spiraled and a smooth inner wall portion 72. As best shown in FIG. 7, the grooved inner wall portion 70 extends between the first end 66 of the body 58 and the smooth inner wall portion 72 of the body 58. The smooth inner wall portion 72 extends between the grooved inner wall portion 70 of the body 58 and a shoulder 74 adjacent the second end 68 of the body 58. The axial bore 64 of the body 58 has a greater cross-extent between opposite sides of the grooved inner wall portion 70 as compared to between opposite sides of the smooth inner wall portion 72 of the body 58. The body 58 further has a protruding polygonal outer wall portion 76 which, in this example, is a protruding hexagonal outer wall portion. There is an annular flange 78 adjacent the second end 68 of the body 58.

The stem 60 is also generally cylindrical, in this example, and has an axial bore 82 extending between a first end 84 and a second end 86 thereof. The stem 60 has an inner wall 88 and an outer wall 90. There is a step 92 which extends about the outer wall 90 of the stem 60 between the first end 84 and the second end 86 of the stem 60. A cross-extent of the stem 60 between the first end 84 thereof and the step 92 is less than a cross-extent between the second end 86 thereof and the step 92. There is a flange 94 extending about the outer wall 90 of the stem 60. The flange 94 is disposed between the step 92 and the second end 86 of the stem 60. There is also a lateral annular groove 96 which extends about the outer wall 90 of the stem 60 between the flange 94 and the second end 86 of the stem 60.

The stem 60 is press-fit into the body 58. Friction between the smooth inner wall portion 72 of the body 58 and the outer wall 90 of the stem 60 secures the body 58 and the stem 60 together as best shown in FIG. 7. There is an annulus 98 between the body 58 and the stem 60 at the hydraulic hose engaging end 54 of the hydraulic fitting 50. The annulus 98 is a function of the axial bore 64 of the body 58 having a greater cross-extent between opposite sides of the grooved inner wall portion 70 of the body 58 as compared to between opposite sides of the smooth inner wall portion 72 of the body 58. A seal in the form of an O-ring 100 sits on the shoulder 74 of the body 58 and is retained in place by the flange 94 of the stem 60. The O-ring 100 functions to prevent hydraulic fluid from leaking out between the body 58 and the stem 60.

Press-fitting the body 58 and the stem 60 allows the hydraulic hose engaging portion of the hydraulic fitting 50 to be constructed from stainless steel without costs and efforts that would be associated with machining an annular recess, corresponding to the annulus 98, into a single work piece. This may facilitate the manufacture of a stainless steel hydraulic hose fitting which is resistant to corrosion and maintains an aesthetically pleasing appearance. Press-fitting the body 58 and the stem 60 may allow the body 58 and the stem 60 to be made from different materials which may be desirable in certain applications.

The swivel nut 62 has a through-bore 102 and a collar 104 which is circumambient of the through-bore 102. The through-bore 102 receives the second end 86 of the stem 60 and there is an annulus 106 between an inner wall 108 of the swivel nut 62 and the outer wall 90 of the stem 60. There is threading 110 on the inner wall 108 of the swivel nut 62 to allow the swivel nut 62 to threadedly engage the hydraulic port 46 of the hydraulic cylinder 16 as shown in FIG. 2. Referring back to FIGS. 5 to 7, there is a seal in the form of an O-ring 112 disposed in the groove 96 on the outer wall 90 of the stem 60. The O-ring 112 functions to prevent hydraulic fluid from leaking out between the swivel nut 62 and the hydraulic port 46 of the hydraulic cylinder 16. A flange 114 extends about an inner wall 116 of the collar 104. The collar 104 couples the swivel nut 62, or the hydraulic port engaging portion of the hydraulic fitting 50, to the hydraulic hose engaging portion of the hydraulic fitting 50 which is comprised of the stem 60 press-fit into the body 58.

Figure 12:
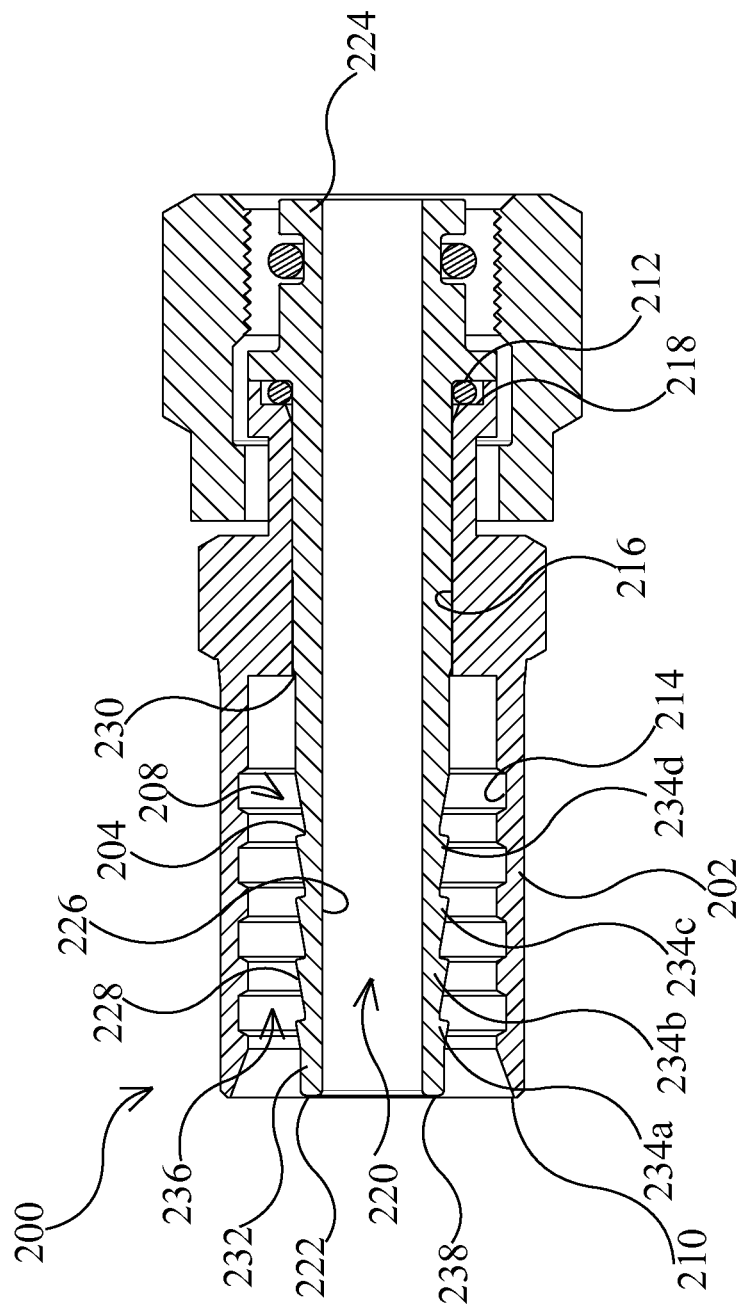
FIG. 12 is a cross-sectional view of the hydraulic fitting of FIG. 8.
Figure 13:
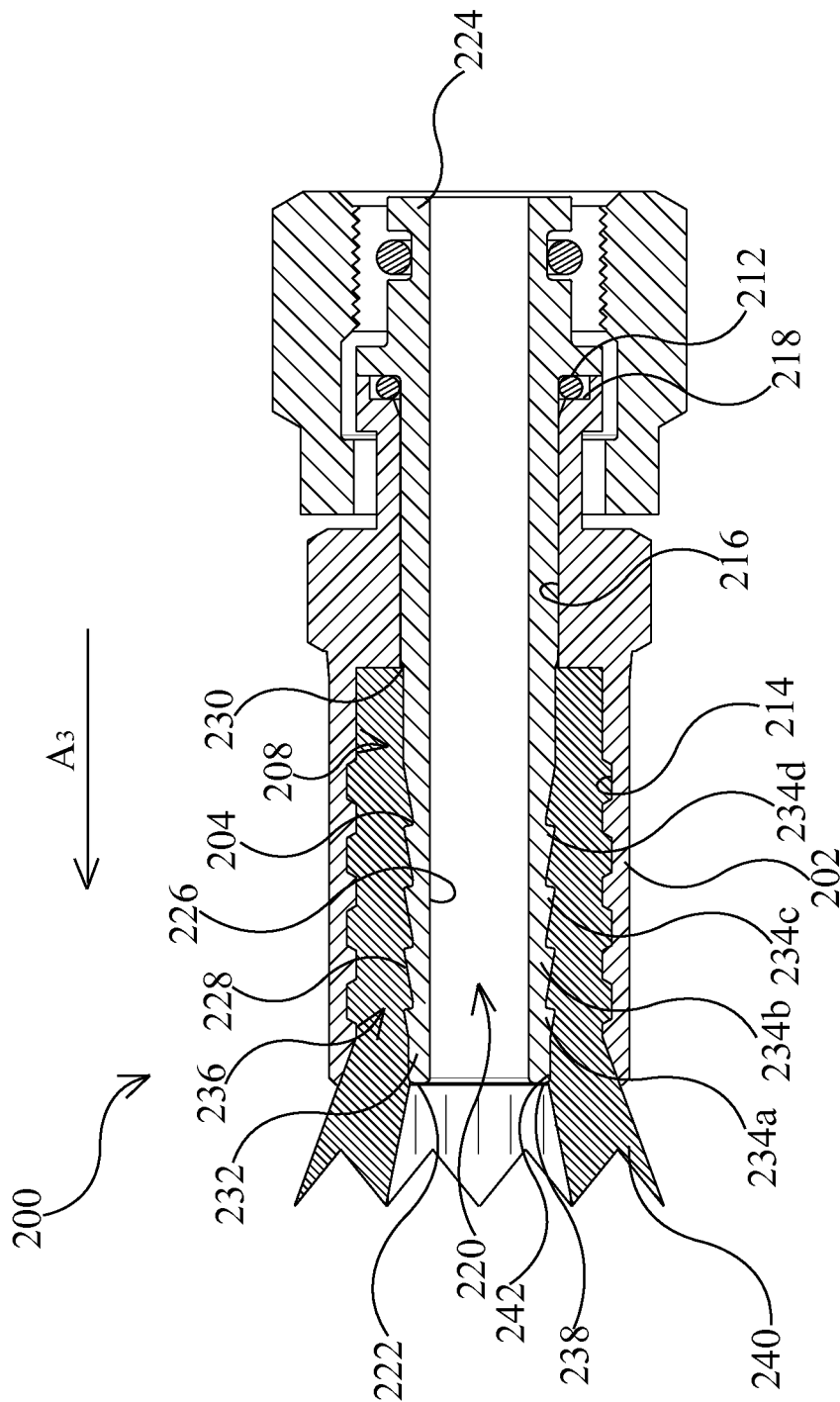
FIG. 13 is a cross-section view showing the hydraulic fitting of FIG. 8 coupled to a hydraulic hose.

Referring now to FIGS. 8 to 13, there is shown a second embodiment of an improved hydraulic fitting 200. The hydraulic fitting 200 generally includes a body 202, a stem 204, and a swivel nut 206. The body 202 is generally cylindrical, in this example, and has an axial bore 208 extending between a first end 210 and a second end 212 thereof. The body 202 also has a grooved inner wall portion 214 and a smooth inner wall portion 216. The grooved inner wall portion 214 in this example consists of a plurality of spaced-apart annular grooves. As best shown in FIG. 12, the grooved inner wall portion 214 extends between the first end 210 of the body 202 and the smooth inner wall portion 216 of the body 202. The smooth inner wall portion 216 extends between the grooved inner wall portion 214 of the body 202 and a shoulder 218 adjacent the second end 212 of the body 202. The axial bore 208 of the body 202 has a greater cross-extent between opposite sides of the grooved inner wall portion 214 as compared to between opposite sides of the smooth inner wall portion 216 of the body 202.

The stem 204 is generally cylindrical, in this example, and has an axial bore 220 extending between a first end 222 and a second end 224 thereof. The stem 204 has an inner wall 226 and an outer wall 228. There is a step 230 which extends about the outer wall 228 of the stem 204 between the first end 222 and the second end 224 of the stem 204. A cross-extent of the stem 204 between the first end 222 thereof and the step 230 is less than a cross-extent between the second end 224 thereof and the step 230. The stem 204 has a collar 232 at the first end 222 thereof which is circumambient of the bore 220. There is a plurality of barbs, for example, barbs 234a, 234b, 234c and 234d extending about the outer wall 228 of the stem 204 between the collar 232 and the step 230.

The stem 204 is press-fit into the body 202. Friction between the smooth inner wall portion 214 of the body 202 and the outer wall 228 of the stem 204 secures the body 202 and the stem 204 together as best shown in FIG. 12. There is an annulus 236 between the body 202 and the stem 204 at a hydraulic hose engaging end 238 of the hydraulic fitting 200. The annulus 236 is a function of the axial bore 208 of the body 202 having a greater cross-extent between opposite sides of the grooved inner wall portion 214 of the body 202 as compared to between opposite sides of the smooth inner wall portion 216 of the body 202. The hydraulic fitting 200 is coupled to a hydraulic hose 240 at the hydraulic hose engaging end 238 thereof. The hydraulic hose 240 is received within the annulus 236 between the body 202 and the stem 204. The barbs 234a, 234b, 234c and 234d on the outer wall 228 of the stem 204 engage an inner wall 242 of the hydraulic hose 240 and resist movement of the hydraulic hose 240 in the direction generally indicated by arrow $A_3$. The hydraulic hose 240 is accordingly restricted from being removed from the hydraulic fitting 200 once the hydraulic hose is inserted into the annulus 236 at the hydraulic hose engaging end 238 of the hydraulic fitting.

It will be understood by a person skilled in the art that although the hydraulic fitting is shown herein coupling a hydraulic hose to a hydraulic actuator that the hydraulic fitting may be used to couple a hydraulic hose to other hydraulic devices.

It will also be understood by a person skilled in the art that many of the details provided above are by way of example only, and are not intended to limit the scope of the invention which is to be determined with reference to the following claims.

What is claimed is:

1. A hydraulic hose fitting comprising:
    a body having an axial bore extending between a first end and a second end thereof, the body having a shoulder adjacent the second end of the body;
    a stem press-fit into the axial bore of the body, the stem having a first end and a second end, an outer wall, a step extending about the outer wall between the first end of the stem and the second end of the stem, and a flange extending about the outer wall thereof between the step and the second end of the stem; and
    a swivel nut coupled to the body, and an O-ring which is received by the shoulder of the body and retained in place by the flange of the stem.

2. The hydraulic hose fitting as claimed in claim 1 wherein the body includes a grooved inner wall portion and a smooth inner wall portion, wherein the grooved inner wall portion extends between the first end of the body and the smooth inner wall portion, and the smooth inner wall portion extends between the grooved inner wall portion and the second end of the body.

3. The hydraulic hose fitting as claimed in claim 2 wherein the outer wall of the stem frictionally engages the smooth inner wall portion of the body when the stem is press-fit into the body.

4. The hydraulic hose fitting as claimed in claim 1 wherein the stem includes an annular groove extending about the outer wall thereof between the flange and the second end of the stem, and wherein there is an O-ring disposed in the annular groove.

5. The hydraulic hose fitting as claimed in claim 1 wherein the swivel nut includes a through-bore and a collar which is circumambient of the through-bore, the collar coupling the swivel nut to the stem press-fit into the body.

6. The hydraulic hose fitting as claimed in claim 1 wherein the body includes a protruding polygonal outer wall portion.

7. The hydraulic hose fitting as claimed in claim 1 wherein the stem includes an outer wall and there is a plurality of barbs extending about the outer wall.

8. The hydraulic hose fitting as claimed in claim 1 wherein the hydraulic hose fitting is made from stainless steel.

9. The hydraulic hose fitting as claimed in claim 1 wherein the body and the stem are made from different materials.

* * * * *

UNITED STATES PATENT AND TRADEMARK OFFICE
CERTIFICATE OF CORRECTION

Page 1 of 1

PATENT NO.         : 9,631,753 B2
APPLICATION NO.    : 14/487086
DATED              : April 25, 2017
INVENTOR(S)        : Neal Wood and Richard Redfern It is certified that error appears in the above-identified patent and that said Letters Patent is hereby corrected as shown below:

In the Claims

Column 6, Lines 31-33 should read:
7. The hydraulic hose fitting as claimed in claim 1 wherein there is a plurality of barbs extending about the outer wall of the stem.

Signed and Sealed this
Twenty-fourth Day of September, 2019

Andrei Iancu
*Director of the United States Patent and Trademark Office*